United States Patent [19]

Dekker et al.

[11] 4,317,210

[45] Feb. 23, 1982

[54] COHERENT RECEIVER FOR ANGLE-MODULATED DATA SIGNALS

[75] Inventors: Cornelis B. Dekker, Torrance, Calif.; Klaas M. Boschma, Eindhoven, Netherlands

[73] Assignee: U.S. Philips Corporation, New York, N.Y.

[21] Appl. No.: 141,543

[22] Filed: Apr. 18, 1980

[30] Foreign Application Priority Data

Feb. 13, 1980 [NL] Netherlands .................. 8000883

[51] Int. Cl.$^3$ .................. H04L 25/10; H03D 3/20
[52] U.S. Cl. .................. 375/76; 375/80; 329/133
[58] Field of Search .............. 329/104, 107, 110, 112, 329/133; 364/484, 701; 375/76, 80, 83, 88, 90, 97; 455/205, 214

[56] References Cited

U.S. PATENT DOCUMENTS

3,688,205  8/1972  Burger .................. 375/76
4,054,842  10/1977  Elliott .................. 329/133

Primary Examiner—Benedict V. Safourek
Attorney, Agent, or Firm—Thomas A. Briody; William J. Streeter; Edward W. Goodman

[57] ABSTRACT

A receiver for angle-modulated signals of the type a $\sin((\omega)t + \phi(t))$, comprising a frequency transposition stage (3) incorporating a local oscillator (3-1). A frequency shift $\Delta\omega$ of the local oscillator relative to the carrier frequency $\omega$ may cause the angle modulation signal $\phi(t)$ to become faded. An argument detector (4) produces the signal $[\phi(t)+(\Delta\omega)t]$ which is differentiated by a differentiator (6) to provide the signal $[d\phi(t)/dt + \Delta\omega]$. A DC-shift detector (7) determines the DC-component $\Delta\omega$ of this signal. This component is integrated by an integrator (8) to provide the signal $(\Delta\omega)t$, which is thereafter subtracted by difference producer (5) from the output signal of the argument detector (4) to provide a clear angle modulation signal.

6 Claims, 8 Drawing Figures

COHERENT RECEIVER FOR ANGLE-MODULATED DATA SIGNALS

BACKGROUND OF THE INVENTION

The invention relates to a receiver for angle-modulated data signals of the type a sin $((\omega)t + \phi(t))$, wherein $\omega$ represents the carrier frequency and $\phi(t)$ the data-dependent angle modulation of the carrier, comprising a demodulation channel having an output for a signal which is a function of the modulation signal $\phi(t)$, the demodulation channel comprising a frequency transposition stage for providing an output signal proportional to sin $((\Delta\omega)t + \phi(t))$ comprising a local carrier oscillator having a frequency which may deviate by an amount $(\Delta\omega)$ from the carrier frequency of the angle-modulated signals applied to the demodulation channel.

Such a receiver is generally known, for which reference is made to IEEE Transactions on Communications, Volume Com-20, No. 3, June 1972, pages 429–35 (de Buda) and Vol. Com. 26, No. 5, May 1978, pages 534–42 (de Jager et al.).

In receivers of this type it is customary to adjust the frequency of the local oscillator so that the frequency difference $\Delta\omega$ between the local oscillator and the received carrier disappears. Such a control circuit is described in, for example, the above-mentioned article by de Buda. A further example is given in Proceedings of the IRE, Vol. 44, No. 12, 1956, pages 1713–8 (Costas). It appears that in the case of a large initial frequency difference $\Delta\omega$, these control circuits have a relatively long adjusting period, which furthermore depends on the signal-to-noise ratio.

For a receiver having two quadrature channels, it has been proposed to sample a reference signal with the symbol clock frequency and with the symbol clock phase at instants which coincide with the zero passages of the demodulated X- and/or Y-signal, to provide a phase control signal for the local oscillator. This method is particularly suitable for angle modulation systems in which the phase of the carrier in a symbol interval changes a predetermined defined amount (for example, 0, $\pi/4$, $\pi/2$) as, for example, described in the above-mentioned article by de Jager et al. In accordance with an alternative proposition the mutual distances between the zero passages of the X-signal and/or the Y-signal is determined and examined for deviations with respect to the symbol period or multiples thereof, to provide a phase control signal. This does not require knowledge of the exact symbol clock phase. Due to the dependence on the zero passages of the demodulated signal, these control methods depend to a very great extent on the noise and have a limited pull-in range at low signal-to-noise ratios.

SUMMARY OF THE INVENTION

It is an object of the invention to provide a receiver for angle modulated data signals of a new concept in which a signal proportional to $\phi(t)$ is obtained, the disturbance of which, as the result of the frequency shift of the local oscillator, is reduced without the need for a control of the frequency of the local oscillator.

According to the invention, the receiver is characterized in that it comprises a frequency discriminator for providing, in response to the output signal of the frequency transposition stage, a signal proportional to $[d\phi(t)/dt + \Delta\omega]$; a DC-shift detector for providing, in response to the output signal of the frequency discriminator, a signal proportional to $\Delta\omega$ and means for providing, in response to the output signal of the frequency transposition stage and the output signal of the DC-shift detector, a signal proportional to $\phi(t)$.

A preferred embodiment of the receiver according to the invention is further characterized in that the frequency discriminator is formed by a cascade arrangement of an argument detector, for the determination of the argument of a circular function, for providing, in response to the output signal of the frequency transposition stage, a signal proportional to $[\phi(t) + (\Delta\omega)t]$, and of a differentiator for providing, in response to the output signal of the argument detector, the signal proportional to $[d\phi(t)/dt + \Delta\omega]$, and that an integrator is present for providing, in response to the output signal of the DC-shift detector, a signal proportional to $(\Delta\omega)t$ and a difference producer being present for providing, in response to the output signal of the argument detector and the output signal of the integrator, the signal proportional to $\phi(t)$.

DESCRIPTION OF THE DRAWINGS

The invention will be further explained with reference to the accompanying drawings.

DESCRIPTION OF THE PREFERRED EMBODIMENT

Figure 1:
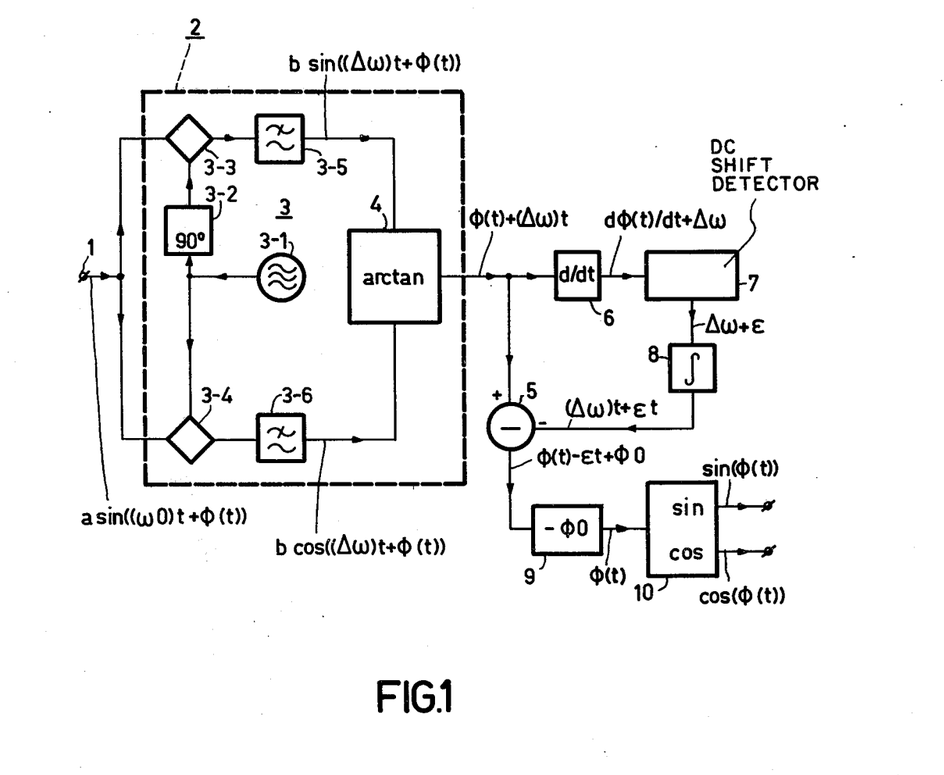
FIG. 1 shows the block schematic diagram of a receiver according to the invention.

Referring to FIG. 1, the receiver has a terminal 1 for receiving an angle modulated signal of the type a sin $((\omega o)t + \phi(t))$. This signal may have passed one or more stages with frequency transposition of a radio receiver before it arrives at terminal 1. The frequency $\omega o$ is then nominally equal to the center frequency of the last intermediate frequency stage.

The signal arriving at terminal 1 is applied to a demodulation channel 2, which comprises a quadrature frequency transposition stage 3 and an argument detector 4 connected thereto.

The frequency transposition stage 3 comprises, interconnected in the customary manner, a local oscillator 3-1, a 90° phase shifting network 3-2, a pair of mixer stages 3-3 and 3-4 and a pair of low-pass filters 3-5 and 3-6. The output signals of these filters are denoted by b sin $((\Delta\omega)t + \phi(t))$ and b cos $((\Delta\omega)t + \phi(t))$, in which $\Delta\omega$ represents the frequency shift of the local oscillator 3-1 with respect to the carrier frequency $\omega o$ of the incoming signals at terminal 1.

The output signals of the low-pass filters 3-5 and 3-6 are applied to an argument detector 4, for the determination of the argument $[\phi(t) + (\Delta\omega)t]$ of the sine and cosine function by means of an arctan operation. This argument detector 4 may be implemented in the manner described in U.S. Pat. No. 3,956,623, using digital circuits. The use of digital circuits necessitates the analog-to-digital conversion of the output signals of the low-pass filters 3-5 and 3-6. The output signal of the argument detector 4 will then be offered in the digital form.

It is not relevant to the invention whether the signals are offered in the analogue or in the digital form. For the description it is of greater importance which quantities the signals represent. For simplicity of the description, the signals will be identified by the quantities they represent; so, for example: the signal $\phi(t)$ instead of: the signal proportional to (the quantity) $\phi(t)$. The description will further be given independent of the fact whether the described functions will be implemented in analogue or digital circuits. For one skilled in the art, it will further be obvious that a sequence of consecutive signal processing functions can be realized by suitable programming of a digital computer.

The output signal of argument detector 4 contains the angle modulation signal $\phi(t)$ and the term $(\Delta\omega)t$ which is the result of the frequency shift of the local oscillator 3-1 with respect to the carrier frequency $\omega_0$ f the incoming signals.

The above-mentioned article by Costas describes a method of deriving a control signal from the output signals of the low-pass filters 3-5 and 3-6 for the control of the frequency of oscillator 3-1 to reduce the frequency shift $\Delta\omega$.

The angle modulation signal $\phi(t)$ may be of the type described in Netherlands patent application No. 7709917 or in the above-described article by de Jager et al. Such an angle modulation signal causes, for example, phase rotations of the carrier of 0, $\pm\pi/4$ or $\pm\pi/2$ radians in one symbol interval of T sec. As a result of the frequency shift $\Delta\omega$, a phase rotation of $(\Delta\omega)T$ radians is added thereto, so that the data-dependent phase rotation becomes faded.

For an example, reference is made to a system comprising a transmitter and a receiver having a transmitting frequency of 150 MHz, a receiving frequency of 160 MHz (intermediate frequency 10 MHz) and consequently a local oscillator 3-1 having a frequency of 10 MHz. When crystal oscillators for the frequencies of 150 and 160 MHz with a stability of $\pm 4$ parts per million (ppm) (at a maximum) and a voltage-controlled crystal oscillator for oscillator 3-1 with a stability of $\pm 10$ pp, are used, then it must be possible to remove a frequency shift $\Delta\omega = \pm 1340$ Hz. The symbol rate is, for example, 16,000 symbols per second. In one symbol interval this frequency shift then causes a phase change $(\Delta\omega)T = \pm 30°$.

In practice the customary control circuits for controlling the frequency of the local oscillator (3-1) were found to have a relatively narrow pull-in range, for example $\pm 250$ Hz at a 6 dB signal-to-noise ratio. For difference frequencies outside this pull-in range the adjusting period becomes too long. In the above-mentioned example the adjusting period has a duration of, for example, 1000 symbol intervals.

A new concept for the receiver, which is not based on a control of the frequency of the local oscillator, will now be described.

The output signal of argument detector 4 is applied to a difference producer 5 and also to a differentiator 6. At the output of differentiator 6, the frequency shift of the local oscillator 3-1 produces a DC-component $\Delta\omega$ in addition to the component $d\phi(t)/dt$. The signal component $d\phi(t)/dt$ represents the data-dependent frequency modulation of the carrier and is a multi-level signal, for example a five-level signal, when a transmitter, described in the above-mentioned Netherlands patent application No. 7709917 or in the above-mentioned article by de Jager et al, is used. Although the invention may be understood without taking cognizance of this Netherlands patent application No. 7709917 and the invention will be described independent thereof, it may be useful for a proper understanding of the following description to take cognizance thereof to learn in what manner an angle modulation signal $\phi(t)$ can be generated to realize an angle modulated signal having a constant envelope and advantageous spectral properties, which may serve here as an example of the modulation of an incoming signal.

A special example is considered an angle modulation signal $\phi(t)$ causing phase changes of 0, $\pm\pi/4$ or $\pm\pi/2$ radians in one symbol interval without intersymbol interference, the signal $d\phi(t)/dt$ being a five-level signal which has been derived from the data bits by correlative multi-level coding and filtering in compliance with the Nyquist-III condition. Hereinafter, this special angle modulation signal $\phi(t)$ will be referred to as the specific (angle modulation) signal $\phi(t)$. It should, however, be understood that the invention is not limited to the processing of the specific signal $\phi(t)$.

A DC-shift detector 7 is connected to differentiator 6 for detecting the DC-component $\Delta\omega$ of the output signal $[d\phi(t)/dt + \Delta\omega]$ of differentiator 6. It should be noted that the data-dependent signal $d\phi(t)/dt$, which is a five-level signal in the case of the specific signal $\phi(t)$, contains also DC-components. Suitable embodiments of the DC-shift detector 7 will be described with reference to the FIGS. 4-6.

The output signal $[\Delta\omega + \epsilon]$, of detector 7 comprises the looked-for DC-component $\Delta\omega$ and a component $\epsilon$, which represents the error which may be made during the determination of $\Delta\omega$. The magnitude of this error may have been influenced by the signal-to-noise ratio; a small error in the case of a high signal-to-noise ratio and a larger error in the case of a lower signal-to-noise ratio. It can be demonstrated that $\epsilon$ is defined by the relation: $\epsilon = \epsilon 1 + \epsilon 2$, wherein $\epsilon 1$ is a fundamental error:

$$\epsilon 1 = -\Delta\omega \cdot \exp(-S/N)$$

and $\epsilon 2$ depends on the accuracy.

The output signal of detector 7 is integrated by integrator 8, resulting in the signal $[(\Delta\omega)t + \epsilon t]$ which is thereafter substracted from the output signal of argument detector 4 in difference producer 5, which results at the output of difference producer 5 in the signal $[\phi(t) - \epsilon t + \phi_0]$, which includes, in addition to the desired signal $\phi(t)$, a dynamic error component $\epsilon t$, which causes a slope in the phase variation as a function of the time, and a static phase error component $\phi_0$. The latter is the result of signal shifts in the path comprising the difference producer and the preceding circuits and which have a static character as a function of the time.

To eliminate the static phase error, a static phase error eliminator 9 is connected to the output of difference producer 5. A small phase slope error $\epsilon t$ is also eliminated in this eliminator. A suitable embodiment of eliminator 9 will be described with reference to FIG. 8.

The output signal $\phi(t)$ of eliminator 9 is applied to a sine-cosine function generator 10, which generates the signals sin $\phi(t)$ and cos $\phi(t)$. This function generator 10 has the inverse function of the argument detector 4 and may be implemented in a simple manner by means of Tables of the sine and cosine functions stored in ROM stores. A suitable embodiment for analogue signals is described in Electronics Letters, Aug. 18, 1977, Volume 13, No. 17, pages 506–8.

The signals sin $\phi(t)$ and cos $\phi(t)$ may further be processed in the usual manner, for example, in the manner described in the above-mentioned articles by de Buda or by de Jager et al.

Figure 2:
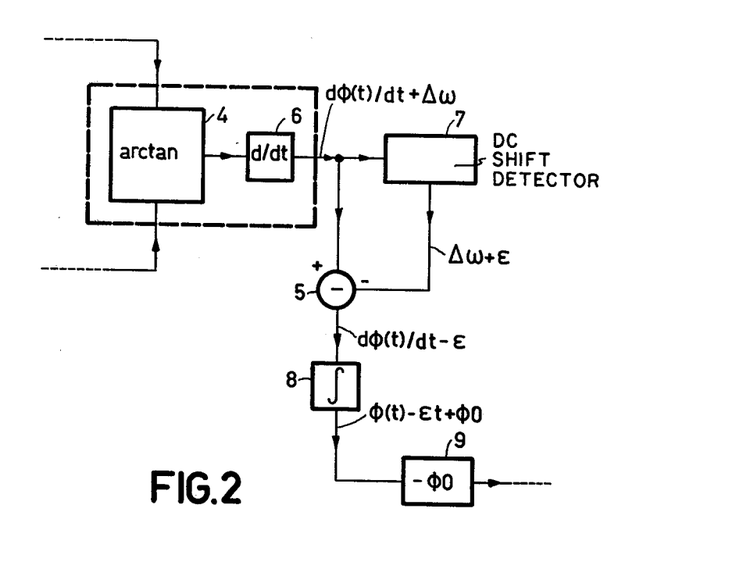
FIG. 2 shows the block schematic diagram of a modification of a portion of the receiver shown in FIG. 1.

FIG. 2 illustrates a modification of a portion of the receiver shown in FIG. 1, corresponding parts having been given the same references. It will be seen that in the receiver shown in FIG. 2, the output signal of differentiator 6 is applied together with the output signal of DC-shift detector 7, to difference producer 5, in which the latter signal is subtracted from the first signal. The output signal of difference producer 5 is thereafter integrated by integrator 8. The argument detector 4 and the differentiator 6 together form a frequency discriminator, so that, alternatively, other types of frequency discriminators may be used in the embodiment shown in FIG. 2.

However, the embodiment of FIG. 2 has a drawback, i.e. integrator 8 must have very accurately the inverse function of differentiator 6 so that the product of the two functions is a constant and the signal $\phi(t)$ is reproduced very accurately at the output of integrator 8. The receiver shown in FIG. 1 does not have this drawback, so that this construction is preferred.

Figure 3:
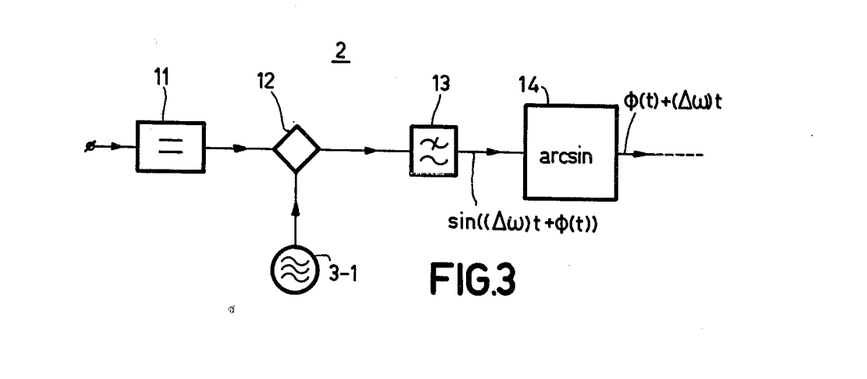
FIG. 3 shows the block schematic diagram of a modification of another portion of the receiver shown in FIG. 1.

FIG. 3 illustrates a modification of the demodulation channel 2 of the receiver shown in FIG. 1. This is the demodulation channel of a nonorthogonal receiver, comprising in sequence a limiter 11, a mixer stage 12 to which the local oscillator 3-1 is connected, a low-pass filter 13 and an argument detector 14. In this case the argument detector 4 effects the arcsine-operation on the output signal of the low-pass filter 13. The output signal $[\phi(t)+(\Delta\omega)t]$ of argument detector 14 may further be processed as in the receiver shown in FIG. 1. The argument detector 14 may be implemented in a simple manner by means of an arcsine-Table which is stored in a ROM-store. In this receiver the limiter 11 has for its function to eliminate disturbing amplitude information. In the receiver shown in FIG. 1 this information is eliminated by the arctan-operation of argument detector 4.

Figure 4:
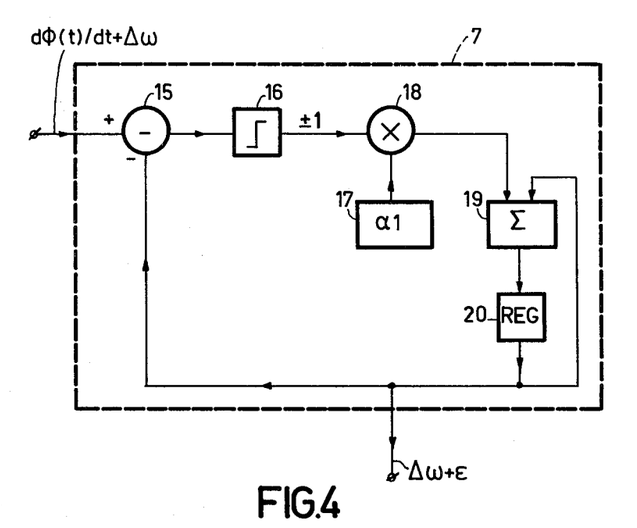
FIGS. 4, 5 and 6 show the circuit diagrams of a first, second and third embodiment of the DC-shift detector of the receiver shown in FIG. 1.

FIG. 4 illustrates a first embodiment of DC-shift detector 7, in which the signal $[d\phi(t)/dt+\Delta\omega]$ is applied together with the output signal of detector 7 to a difference producer 15, in which the latter signal is subtracted from the first signal.

The difference signal produced by difference producer 15 is applied to a sign detector 16 to determine whether the difference signal has a positive or a negative polarity. A constant $\alpha 1$, which is stored in a store 17, is provided by multiplier 18 with the sign of the difference signal. Thereafter, the output signal of multiplier 18 is added to the output signal of detector 7 by adder 19. The output signal of adder 19 is the corrected output signal for detector 7 and is stored in a register 20 which provides the output signal of detector 7.

When the input signal of detector 7 is greater than the output signal, the output signal is increased with a step of the size $\alpha 1$ and in the other case it is reduced by a step of the size $\alpha 1$. The described functions may be repeated a number of times, for example eight times, in each symbol interval, controlled by a clock having the period $T_s = T/8$. This results in that the output signal tends to the amplitude which, statistically occurs most frequently in the signal $[d\phi(t)/dt + \Delta\omega]$. In the case of the specific signal $\phi(t)$, the zero level occurs statistically most frequently in the signal $d\phi(t)/dt$. Then, the output signal of detector 7 tends to the DC-component $\Delta\omega$. When the signal $\phi(t)$ has been formed thus that, possibly, a level different from the zero level occurs statistically most frequently in the signal $d\phi(t)/dt$, a corresponding correction may be made into the opposite direction by substracting a fixed level therefrom.

The control speed of detector 7 will depend on the step size $\alpha 1$; for a high value of $\alpha 1$ the control speed will be high. The error $\epsilon 2$ which, considered as a function of the time, manifests itself as a ripple on the signal $\Delta\omega$ is, however, smaller for a lower value of the step size. The step size $\alpha 1$ expressed in Hz may vary from, for example, 0.06 Hz to 1.44 Hz for a slow control with a high accuracy to a rapid control with a lower accuracy.

Figure 5:
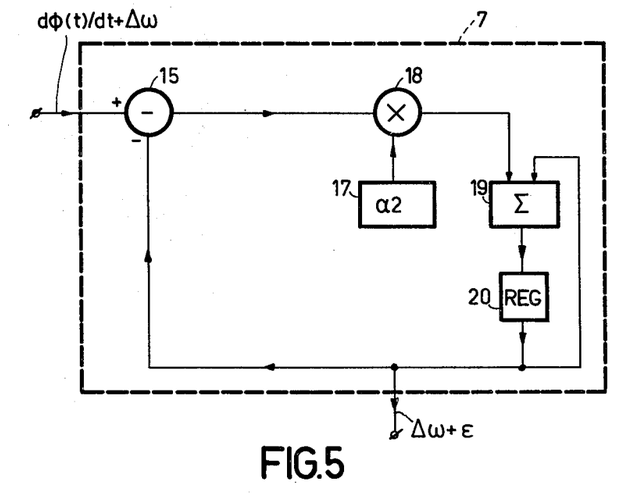

A second embodiment of DC-shift detector 7 which is suitable for use at low values of the signal-to-noise ratio is shown in FIG. 5. Parts corresponding with those in FIG. 4 have been referenced correspondingly.

In detector 7 of FIG. 5, the output signal of difference producer 15 is multiplied by the constant $\alpha 2$ in multiplier 18. Thereafter, the output signal of multiplier 18 is added to the output signal of detector 7 by adder 19. The output signal thereof is stored in register 20. As was the case for FIG. 4, the described functions will be repeated a number of times in each symbol period.

When the input signal of detector 7 is larger than the output signal, the output signal is increased by a step which is equal to the difference between the two signals multiplied by the constant $\alpha 2$. Here, the step size is not constant but depends on the magnitude of the difference signal. This method appears to be advantageous in the case where the probability distribution of the amplitude of the signal $d\phi(t)/dt$ is a monotonously decreasing function, which, for the specific signal $\phi(t)$, is the case for low values of the signal-to-noise ratio.

Figure 6:
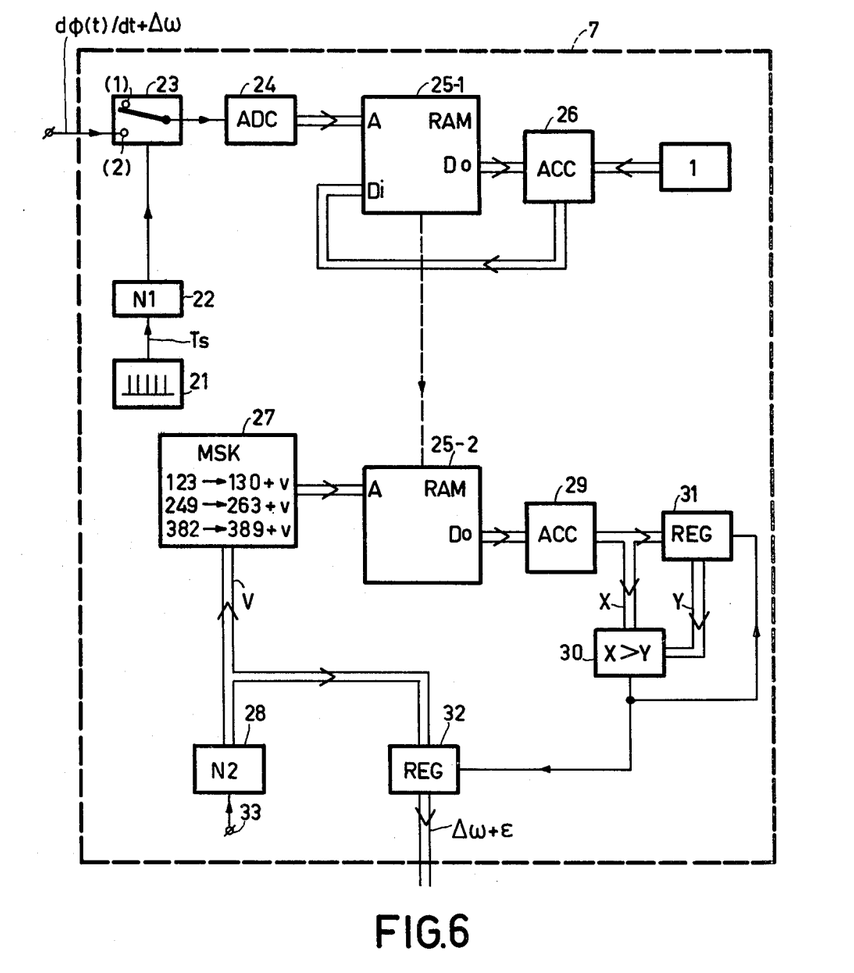

A third embodiment of DC-shift detector 7 which can be adapted to the statistic properties of the signal $d\phi(t)/dt$ is shown in FIG. 6. Herein N1 samples of the (analogue)input signal $[d\phi(t)/dt+\Delta\omega]$ are converted by an analogue-to-digital converter 24 into addresses of a RAM store 25-1, under the control of a clock 21 having a period $T_s = T/8$, and a counter 22 and a switching circuit 23. For each signal sample, the number stored in the corresponding storage location of store 25-1 is read and increased by one in accumulator 26 and thereafter written again into the same storage location. In this manner, a signal histogram which represents the probability density distribution of the amplitude of the signal $[d\phi(t)/dt+\Delta\omega]$ is obtained in store 25-1.

Figure 7:
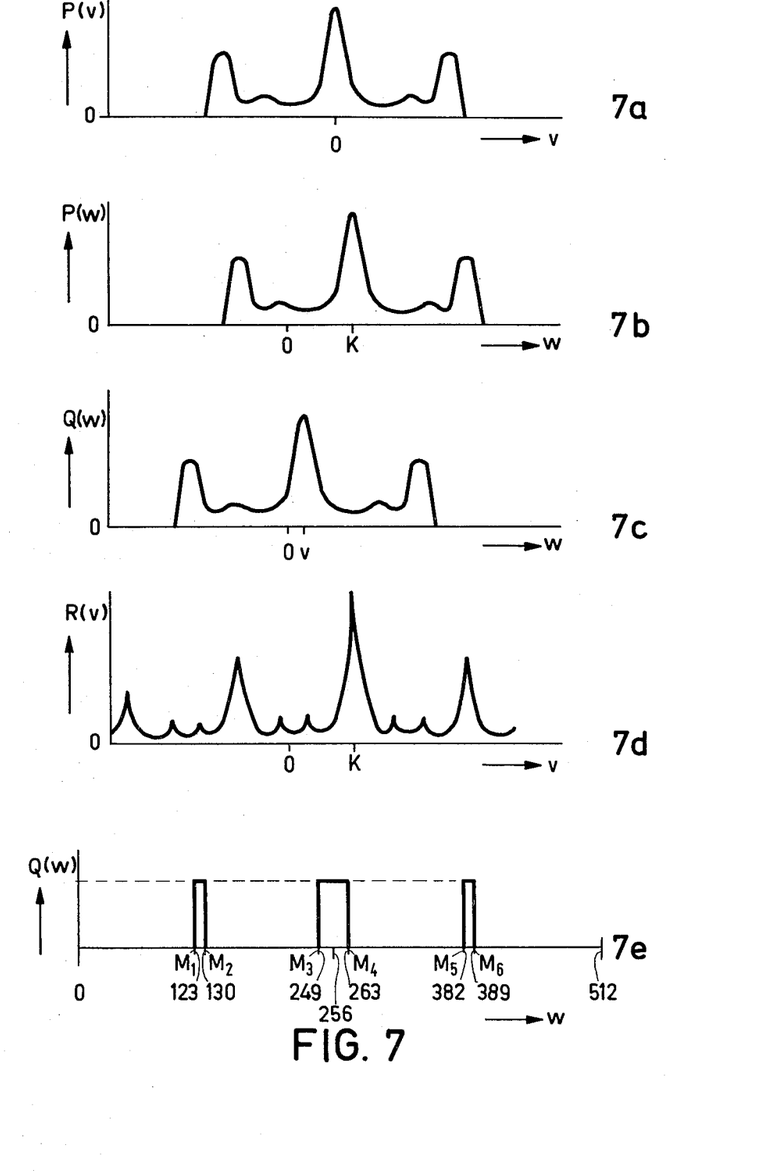
FIGS. 7a–7e show some diagrams to explain the operation of the device shown in FIG. 6.

In the case of the specific signal $\phi(t)$, the probability density distribution $P(v)$ of the amplitude of the signal $d\phi(t)/dt$ is illustrated in FIG. 7a. The central maximum is at the zero level; this corresponds with the data-bit sequence 010101 etc. The two secondary maxima correspond with sequences of ones (111) and zeros (000), respectively.

In the case of a frequency shift $\Delta\omega = K$, the probability distribution shifts for an amount K, as illustrated in FIG. 7b. This shift can be determined by determining the cross-correlation $R(v)$ of the probability distribution $P(w)$ of the incoming signal (FIG. 7b) with a mask $Q(w)$, which represents the standard probability-density distribution of the signal dφ(t)/dt in accordance with the expression:

$$R(v) = \int_{-\infty}^{+\infty} P(w) Q(w + v) dw$$

The cross-correlation R(v) is illustrated in FIG. 7d; this function has a maximum at v=K, which corresponds with the DC-component Δω=K looked for.

FIG. 7e shows a form of the mask Q(w) which is advantageous for use in the DC shift detector 7 shown in FIG. 6. The addresses of the store 25-1, which correspond with the amplitude values are plotted on the horizontal axis. The magnitude of Q(w) is one in the intervals M1–M2, M3–M4 and M5–M6 whose numerical values, for a special case, are indicated in the Figure. The cross-correlation may then be performed for each value of the variable v, by summing the content of the storage location of all addresses of store 15-1 for which Q(w+v)=1. The variable v may be limited to the interval −123 < v < +123.

In the portion of DC-shift detector 7 shown in the bottom portion of FIG. 6 the cross-correlation with the mask Q(w) shown in FIG. 7e is performed. The store 25-2 shown in this portion of FIG. 6 is assumed to comprise the signal histogram of the incoming signal [dφ(t)/dt+Δω]. The store 25-2 may be the same store as the store 25-1 and may have been switched over from one portion of DC-shift detector 7 to the other portion, in which case recording the signal histogram and calculating the correlation function are carried out one after the other. The store 25-2 may, alternatively, be a separate store, in which case the two operations can be carried out simultaneously. After an operation has been carried out the stores are switched over, so that the other operation can be carried out with the aid of the relevant store.

The mask (MSK) is stored in a cyclic store 27. This store contains the addresses which are plotted in FIG. 7e on the horizontal axis, for which Q(w)=1. A counter 28 supplies the variable v which is added to each address read from store 27. The number of values v can assume are indicated by N2. For each value of v, the store 27 is read completely and, after addition of the value of v, all addresses are applied to store 25-2. This store is read at all these addresses and the contents of the corresponding storage locations are added together in accumulator 29.

The final result X is compared in a comparator 30 with a value Y which was stored in a register 31. When X exceeds Y, the position of counter 28 is transferred to a register 32 and the value of X is transferred to register 31. The register 32 provides the output signal Δω of the DC-shift detector 7.

After each determination of a value of X the position of counter 28 is increased by one by a control pulse at input terminal 33, whereafter the procedure for the determination of a value of X, for a new value of v, repeats itself. The signal in register 32 is renewed each time a value of X has been found which exceeds all preceding values of X, so that this signal tends to the position v=K of the maximum of the correlation function (FIG. 7d). This position corresponds with the looked for value of the frequency shift Δω=K.

The described operations for forming the signal histogram and the determination of the cross-correlation can be repeatedly carried out to adapt the output signal of the DC-shift detector 7 each time to the actual situation.

The output signal of the difference producer 5 in FIG. 1 and of integrator 8 in FIG. 2 comprises a static phase error φo. This error can be eliminated using the static phase error eliminator 9 shown in FIG. 8, which is adapted to the special signal φ(t). This signal has the property that phase changes of 0° in a symbol interval can only occur at phases which are equal to φ(o)+(2n+1)π/4 radians. (In this case φ(o)=0°).

Figure 8:
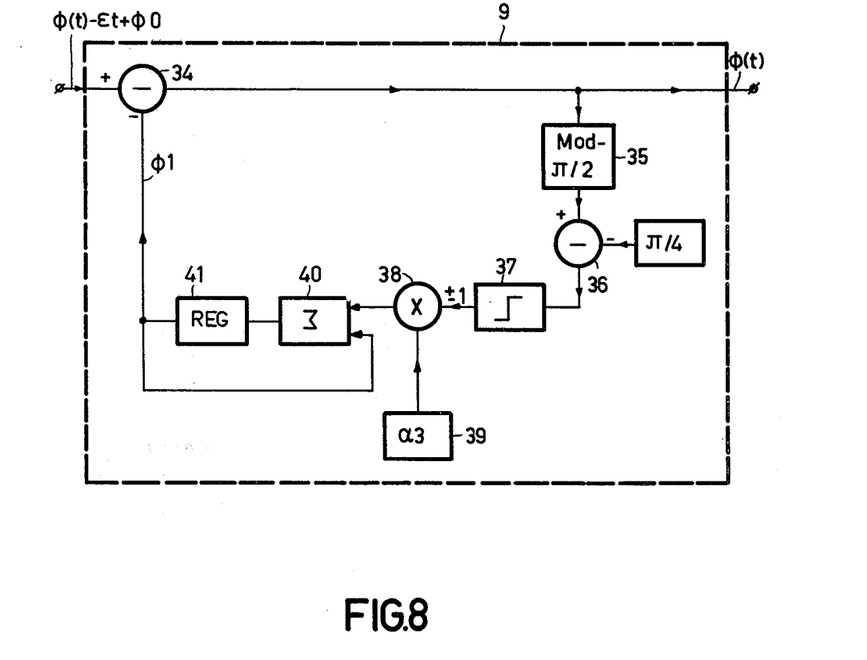
FIG. 8 shows the circuit diagram of an embodiment of the static phase error correction device of the receiver shown in FIG. 1.

In eliminator 9 of FIG. 8 the incoming signal [φ(t)−εt+φo] is applied together with a correction signal φ1 to a difference producer 34 in which said last signal is subtracted from the first-mentioned signal. The output signal of difference producer 34 is the output signal φ(t) of eliminator 9.

The output signal of eliminator 9 is applied to a modulo π/2 converter 35, which adds an amount which corresponds with a phase level of an integral number of times π/2 radians to the signal φ(t) or subtracts it therefrom to provide a signal [φ(t) modπ/2] in the range between zero and a phase level of π/2 radians. Difference producer 36 subtracts an amount corresponding with a phase level of π/4 radians from the output signal of converter 35. The difference producer 36 thus provides the difference signal between the signal φ(t) and the nearest phase level of (2n+1)π/4 radians.

A sign detector 37 detects the sign of the output signal of difference producer 36. A multiplier 38 provides a constant α3, stored in store 39, with the sign of the output signal of difference producer 36 and the result is added by adder 40 to the correction signal φ1. Thereafter, the output signal of adder 40 is stored in register 41. This register supplies the correction signal φ1.

Under the control of a clock, the described functions are repeated a number of times in each symbol period and each time the value of the correction signal φ1 is increased or decreased with a step of a size α3. When φ(t) does not change in a symbol interval, the output signal of difference producer 36 is then a measure of the static phase error and φ1 will tend by a number of steps in the same direction to the static phase error. This will be the case for all symbol intervals in which φ(t) does not change. In the symbol intervals in which φ(t) changes, the correction signal will first change by a number of steps into the one and thereafter by a different number of steps into the other direction. The correction signal then indeed tends to a certain direction, but shows a ripple thereon, which will, however, be smaller for low values of the step size.

The step size determines the size of the pull-in range in dependence upon the signal-to-noise ratio; for a large signal-to-noise ratio α3 may be given a high value to obtain a large pull-in range; for a small signal-to-noise ratio α3 must be given a lower value to realize a large pull-in range.

What is claimed is:

1. A receiver for angle-modulated data signals of the type a sin ((ω)t+φ(t)), where ω represents the carrier frequency and φ(t) the data-dependent angle modulation of the carrier, comprising a demodulation channel having an output for a signal which is a function of the modulation signal φ(t), the demodulation channel comprising a frequency transposition stage for providing an output signal proportional to sin ((Δω)t+φ(t)) comprising a local carrier oscillator having a frequency which may deviate by an amount (Δω) from the carrier frequency of the angle-modulated signals applied to the demodulation channel, characterized in that the receiver comprises a frequency discriminator for providing, in response to the output signal of the frequency transposition stage, a signal proportional to $[d\phi(t)/dt+\Delta\omega]$; a DC-shift detector for providing, in response to the output signal of the frequency discriminator, a signal proportional to $\Delta\omega$ and means for providing, in response to the output signal of the frequency transposition stage and the output signal of DC-shift detector, a signal which is proportional to $\phi(t)$.

2. A receiver as claimed in claim 1, characterized in that the frequency discriminator is formed by a cascade arrangement of an argument detector for providing, in response to the output signal of the frequency transposition stage, a signal which is proportional to $[\phi(t)+(\Delta\omega)t]$, a differentiator for providing, in response to the output signal of the argument detector, the signal which is proportional to $[d\phi(t)/dt+\Delta\omega]$, an integrator for providing, in response to the output signal of the DC-shift detector, a signal proportional to $(\Delta\omega)t$ and a difference producer for providing, in response to the output signal of the argument detector and the output signal of the integrator, the signal which is proportional to $\phi(t)$.

3. A receiver as claimed in claim 1 or 2, characterized in that the DC-shift detector comprises
   means for forming the difference between the signal proportional to $[d\phi(t)/dt+\Delta\omega]$ and the output signal of the DC-shift detector for providing a difference signal
   means for the determination of the sign of the difference signal for providing a sign signal
   means for changing, in response to the sign signal, the output signal of the DC-shift detector by a given amount so that the value of the difference signal decreases, to provide a corrected output signal and
   means for recording the corrected output signal for providing the output signal of the DC-shift detector.

4. A receiver as claimed in claim 1 or 2, characterized in that the DC-shift detector comprises:
   means for forming the difference between the signal proportional to $[d\phi(t)/dt+\Delta\omega]$ and the output signal of the DC-shift detector for providing a difference signal
   means for multiplying the difference signal by a given factor for providing a correction signal
   means for adding the correction signal to the output signal of the DC-shift detector for providing a corrected output signal and
   means for recording the corrected output signal for providing the output signal of the DC-shift detector.

5. A receiver as claimed in claim 1 or 2, characterized in that the DC-shift detector comprises:
   means for forming a signal histogram representing the probability-density distribution of the amplitude of the signal proportional to $[d\phi(t)/dt+\Delta\omega]$,
   means for recording a mask representing a standard probability-density distribution,
   means for determining the cross-correlation of the mask with the signal histogram to provide a cross-correlation signal as a function of the relative amplitude shift between the mask and the signal histogram and
   means for determining the amplitude shift at which the cross-correlation signal has the maximum value, to provide the output signal of the DC-shift detector which is proportional to the said last amplitude shift.

6. A receiver as claimed in claim 1 or 2, characterized in that a static phase error eliminator is present for removing the static phase error from the signal proportional to $\phi(t)$, comprising
   a difference producer for forming the difference between the signal proportional to $\phi(t)$ and a correction signal to provide an output signal of the static phase error eliminator
   means for forming the difference between the output signal and the nearest phase level of $(2n+1)\pi/4$ radians, wherein n is an integer, to provide a difference signal
   means for determining the sign of the difference signal, to provide a sign signal
   means for changing, in response to the sign signal, the correction signal by a given amount so that the magnitude of the difference signal decreases, to provide a corrected correction signal and
   means for recording the corrected correction signal for providing the correction signal.

* * * * *